(12) United States Patent
Bramley

(10) Patent No.: US 6,197,250 B1
(45) Date of Patent: Mar. 6, 2001

(54) TELESCOPIC DROSS POT

(75) Inventor: Alan Bramley, Nottingham (GB)

(73) Assignee: J. McIntyre (Machinery) Limited (GB)

( * ) Notice: Subject to any disclaimer, the term of this patent is extended or adjusted under 35 U.S.C. 154(b) by 0 days.

(21) Appl. No.: 09/548,055

(22) Filed: Apr. 12, 2000

(51) Int. Cl.⁷ .................................. C21B 3/04; C21B 7/14
(52) U.S. Cl. ............................................. 266/227; 266/275
(58) Field of Search .................................. 266/227, 205, 266/232, 275; 75/585, 672

(56) References Cited

U.S. PATENT DOCUMENTS

| | | | |
|---|---|---|---|
| 4,386,956 | * 6/1983 | Roth et al. | 266/227 |
| 5,397,104 | * 3/1995 | Roth | 266/227 |
| 5,669,957 | * 9/1997 | Roth | 75/585 |
| 5,788,918 | 8/1998 | Bramley | 266/158 |
| 5,811,056 | 9/1998 | Bramley | 266/205 |
| 5,882,580 | 3/1999 | Pownall | 266/205 |
| 5,980,817 | 11/1999 | Pownall | 266/205 |
| 6,063,330 | 5/2000 | Bramley | 266/205 |

* cited by examiner

*Primary Examiner*—Scott Kastler
(74) *Attorney, Agent, or Firm*—Reese Taylor

(57) ABSTRACT

A dross pot and sow mould combination for use with a dross press, the combination being suitable for melting furnaces with low sills. The sow mould is connected to the dross pot by a variable length connection which allows the height of the combination to be low when the combination is positioned by the furnace, but larger when the combination is positioned in the dross press.

5 Claims, 5 Drawing Sheets

TELESCOPIC DROSS POT

Figure 1:
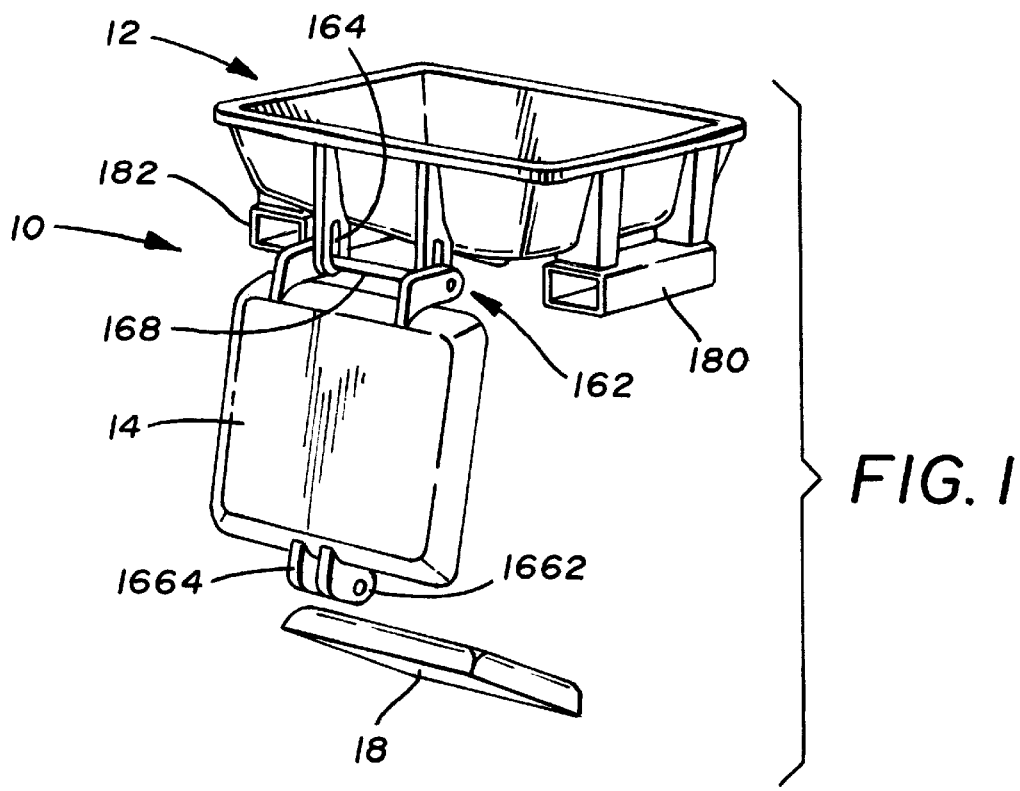

The present invention relates to a telescopic dross pot and more particularly to a dross pot and sow mould combination and, in particular, a combination for use with a dross press.

The known operation of a dross press comprises the steps of removing dross from a furnace, depositing the dross into a dross pot and then transporting the dross pot to the press. During the transportation process "free" aluminum will drain from the dross pot through one or more drainage holes. To contain this free aluminum the dross pot is combined with a sow mould positioned under the dross pot and this sow mould collects the free aluminum during transportation During the pressing operation, the dross in the dross pot is subjected to pressure from the press head and the aluminum pressed from the dross is drained into and then contained in the sow mould.

The sow mould has therefore to be of a size to contain a fixed percentage, say for example 25% of the weight of dross in the dross pot since this will be the anticipated aluminum yield.

This presents a problem, since the dross pot is positioned above the sow mould and therefore for a given size of dross pot/sow mould combination the height of the top edge of the dross pot has to be a minimum value above ground level.

Therefore, for a given design of furnace there will be a maximum height of the top edge of the dross pot.

For furnaces with a high front sill, this will not be a problem. However, many furnaces already installed have relatively low front sills. These furnaces cannot be readily modified to raise the sill level.

A known solution to this problem lies in the use of smaller dross pot/sow mould combinations. For relatively large furnaces, however, this is not a satisfactory solution because the dross would not be recycled quickly enough in a single dross press. Thus, if smaller dross pot/sow mould combinations are used, then extra dross presses will be required. This not only adds to the expenditure in the initial installation, but also will significantly add to the running costs since more operations will be required.

It is an object of the present invention to provide a dross pot/sow mould combination which is particularly suitable for low sill furnaces.

The present invention provides a dross pot and sow mould combination, comprising mounting means connected to said dross pot and said sow mould to connect together said dross pot and said sow mould in a relationship in which said dross pot is mounted above said sow mould in which the mounting means connecting the dross pot and the sow mould comprises means enabling the sow mould to move relative to the dross pot to vary the distance between the dross pot and the sow mould.

Preferably the sow mould is suspended beneath the dross pot, said mounting means comprising extendable means.

Preferably said extendable means comprises slot means allowing said sow mould to move towards and away from said dross pot by a defined distance.

Preferably said slot means comprises first and second slotted members on a first side of said dross pot and at least a third slot means on an opposite side of said dross pot.

Preferably said third slot means includes releasable latch means and said first and second slot members comprise hinge members thereby allowing said sow mould to pivot relative to said dross pot.

This movement allows an aluminum pig within the sow mould to be tipped out.

Figure 2:
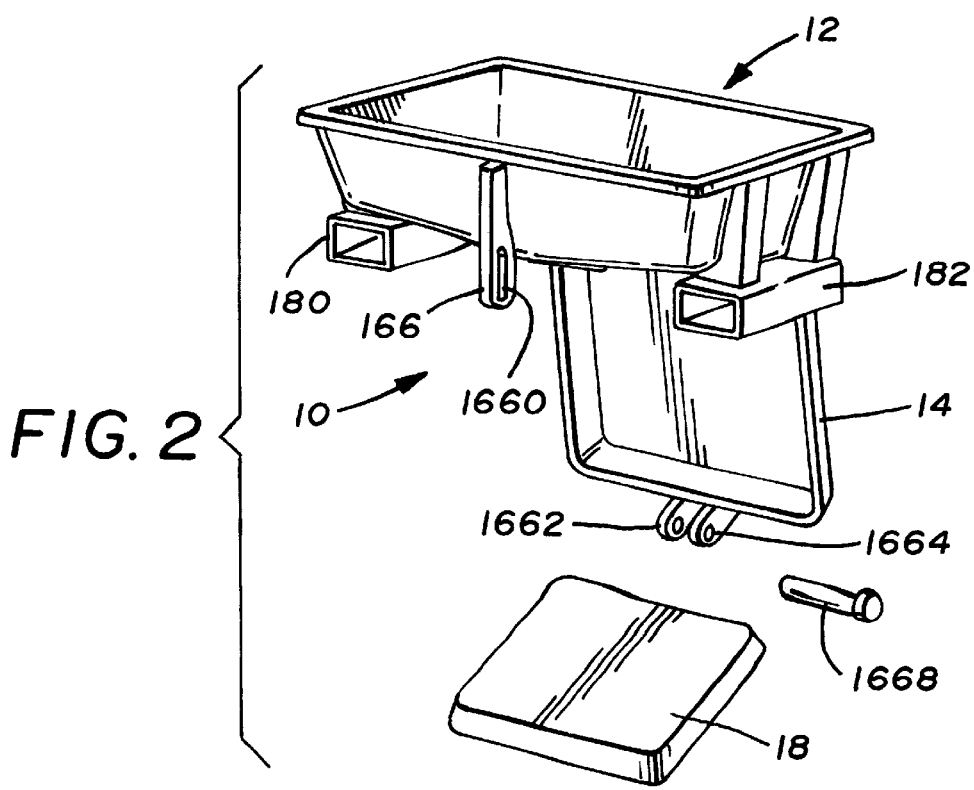
Figure 3:
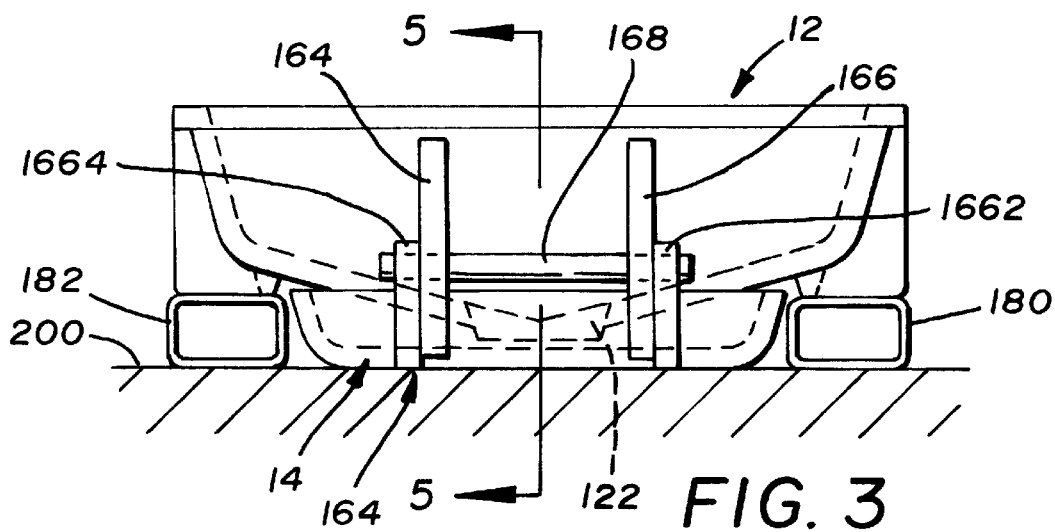
Figure 4:
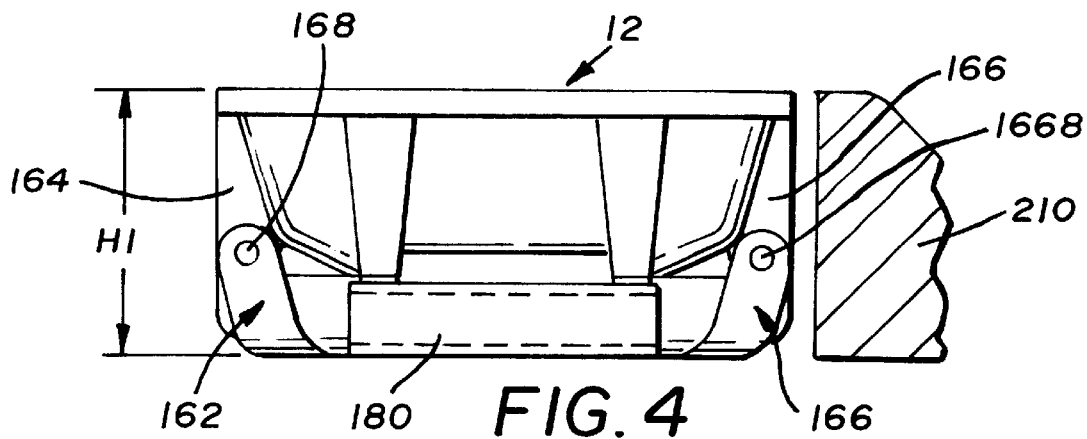
Figure 5:
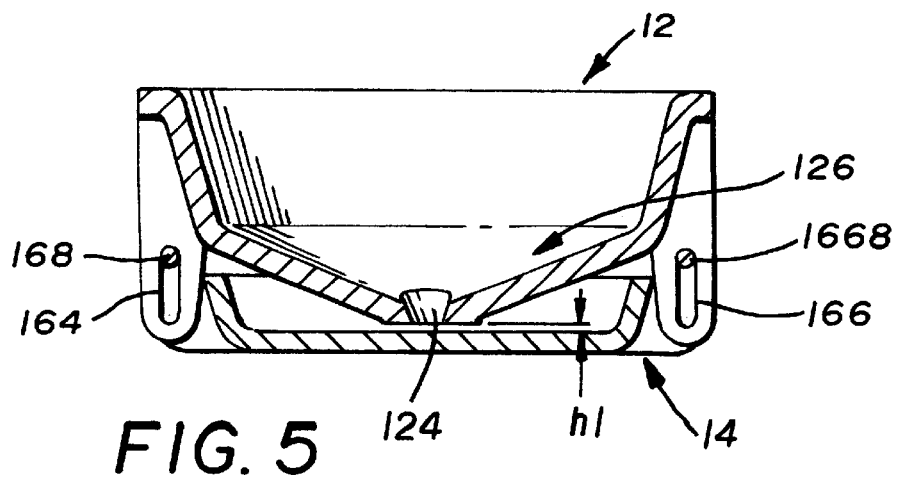
Figure 6:
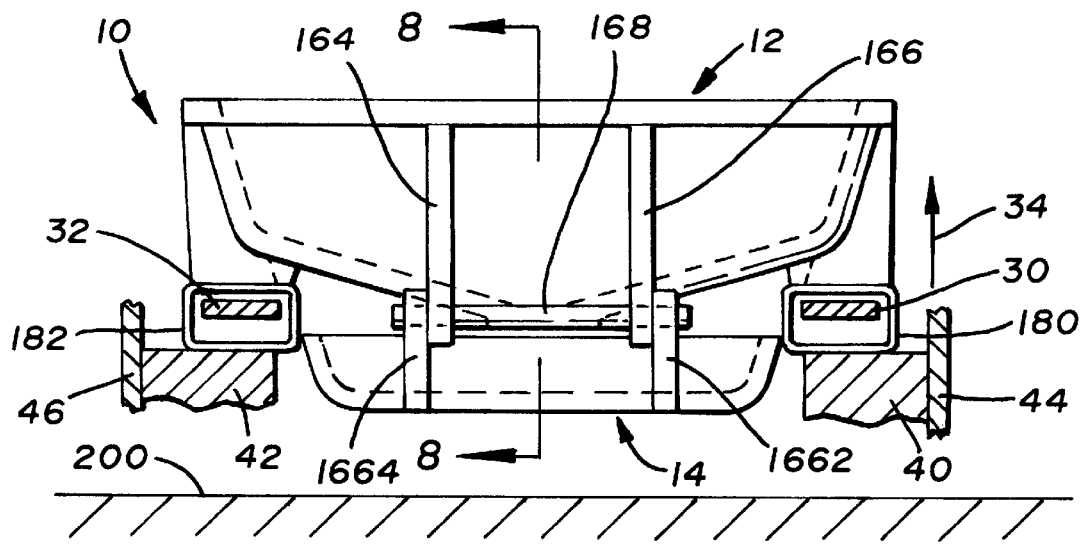
Figure 7:
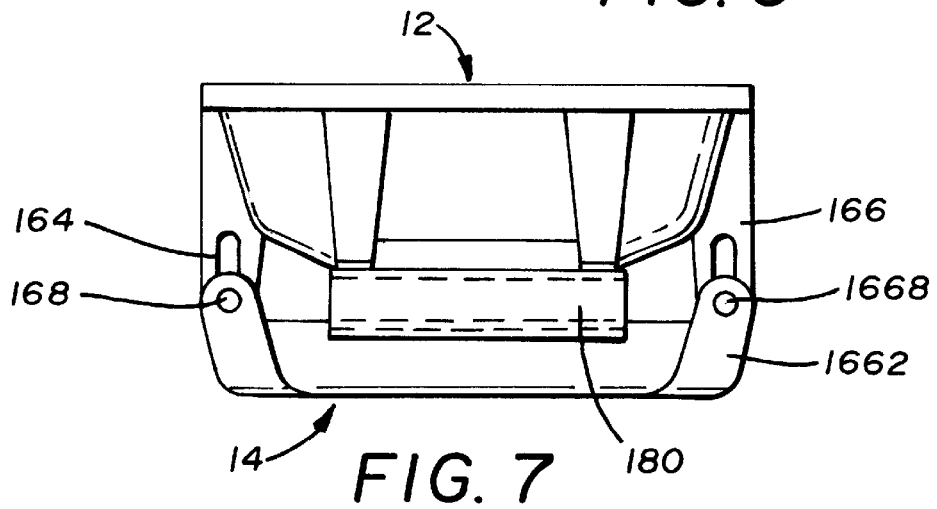
Figure 8:
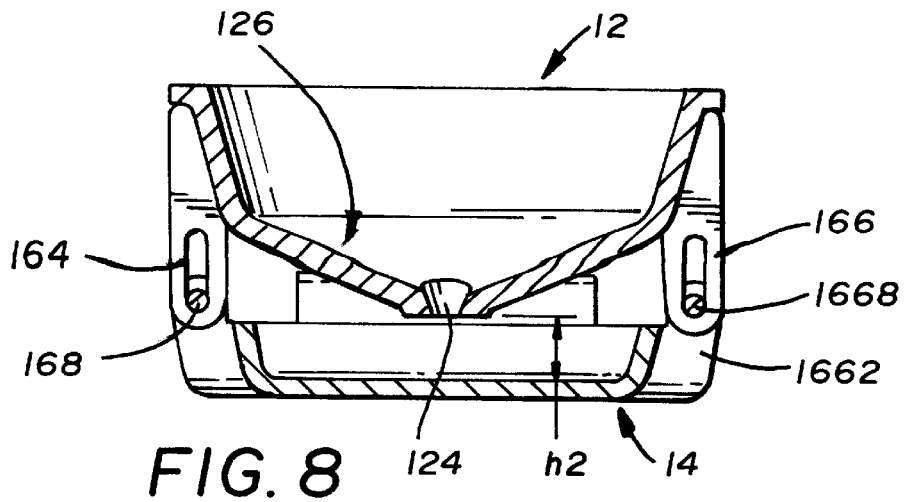
Figure 9:
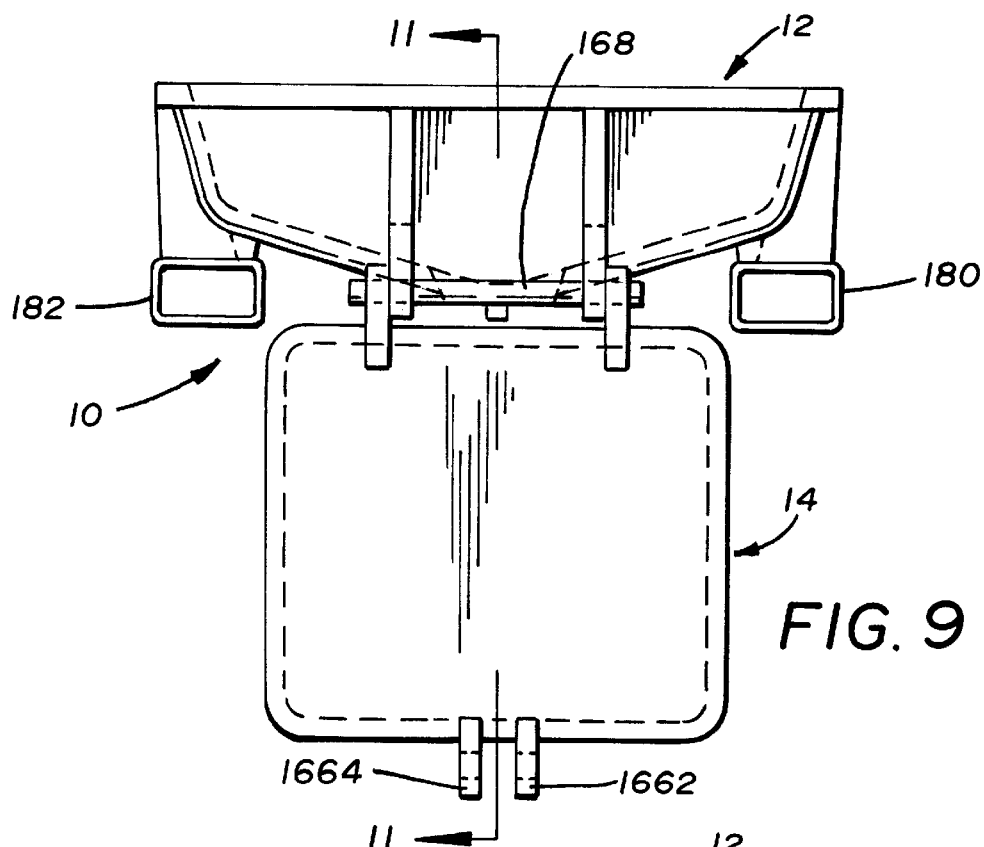
Figure 10:
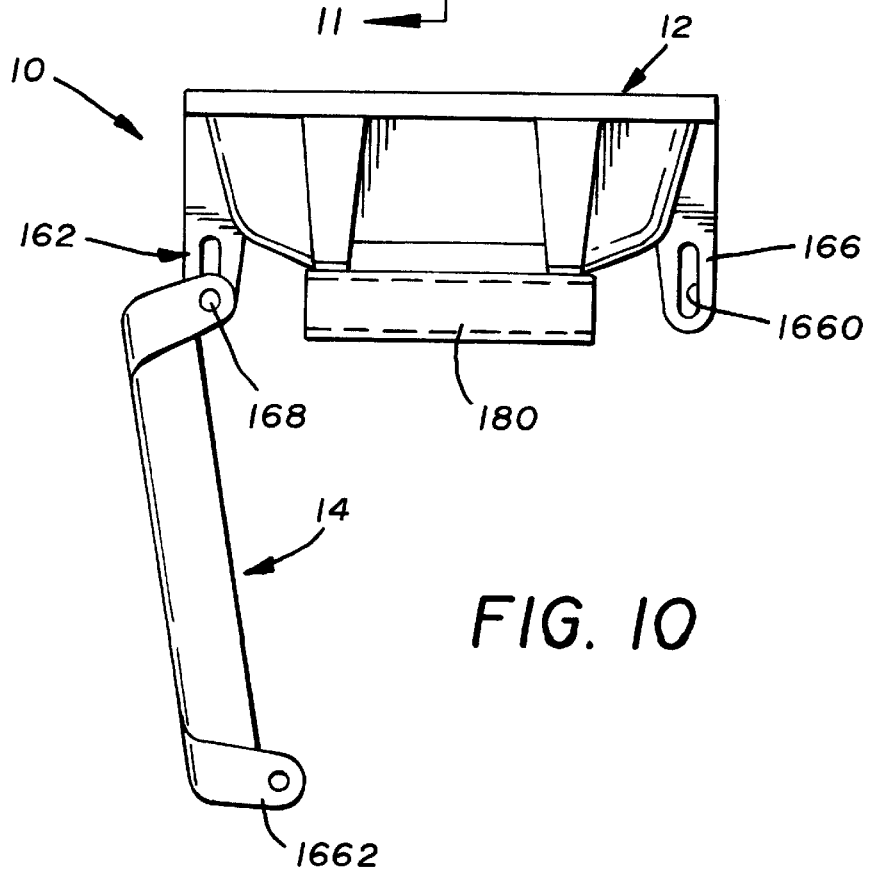
Figure 11:
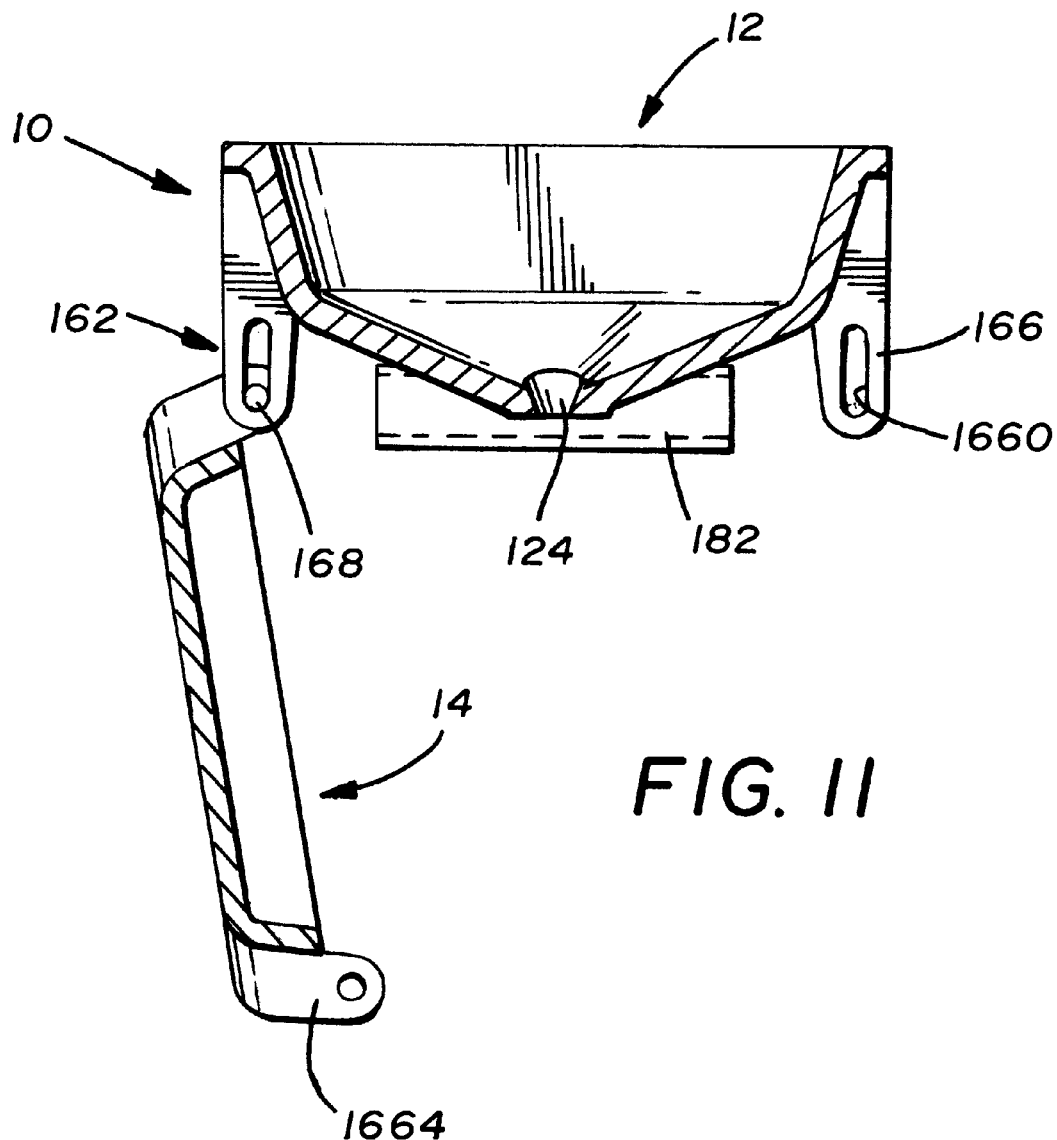

The present invention will now be described, by way of example with reference to the accompanying drawings in which:

FIG. 1 shows a perspective view of the dross pot and sow mould combination according to the present invention, FIG. 2 shows the combination of FIG. 1 in perspective view from the opposite side, FIG. 3 shows the combination of FIG. 1 in a first, contracted state, in side elevation, FIG. 4 shows the combination of FIG. 3 in end elevation, FIG. 5 shows the combination of FIG. 3 in cross section on line B—B, FIG. 6 shows the combination of FIG. 1 in a second extended state in side elevation, FIG. 7 shows the combination of FIG. 6 in end elevation, FIG. 8 shows the combination of FIG. 6 in cross section on line A—A, FIG. 9 shows the combination of FIG. 1 in side elevation in a third state, illustrating the tipping action of the sow mould, FIG. 10 shows the combination of FIG. 9 in end elevation, and FIG. 11 shows the combination of FIG. 9 in cross section on line C—C.

With reference now to FIGS. 1 and 2, the dross pot and sow mould combination 10, hereinafter referred to as the combination, is shown in a first perspective view.

The dross pot 12 is connected to the sow mould 14 by means of a variable length mounting means 16 comprising first and second slot means 162,164 on a first side of such combination and a third slot means 166 on the opposite side.

A pig or ingot 18 is shown after being ejected from the sow mould 14 which is shown in a pivoted condition, hinged by a pin member 168 connected between the slot members 162,164.

The slot member 166 comprises a first slotted plate 1660 cooperating with two plate members 1662,1664. A pin 1668 is provided to secure sow mould 14 in position as shown in FIGS. 3 to 11 to which reference is now made.

FIG. 3 is a partial diagrammatic representation of the combination illustrating the outline of the combination in solid lines and showing the thickness and internal features in dotted lines.

In FIGS. 3 to 11, features are given the same reference numerals as in FIGS. 1 and 2.

The combination is provided with rectangular section tubes 180, 182 which enable the combination to be lifted by forks (30, 32—see FIG. 6) on a forklift truck (not shown).

The constructive details of the combination may be seen in FIGS. 3 to 5 and subsequently in FIGS. 6 to 8 and 9 to 11.

The operation of the combination can be seen from FIGS. 3, 6 and 9 and FIGS. 4, 7 and 10 and FIGS. 5, 8 and 11.

In FIGS. 3 to 5, the ground level is indicated at 200. When the combination rests in the ground the slotted means 162, 164, 166 are retracted to allow the combination to assume a minimum height (FIG. 4).

With reference to FIG. 3, the base section 122 of the dross pot which comprises a drainage hole 124 (FIG. 5) is seen to almost touch the inside surface of the sow mould 14 as shown by dotted line 142.

The combination can be positioned against a furnace wall 210 (FIG. 4) shown diagrammatically and only partially. The height of the furnace opening can therefore be H1.

Melting furnaces are well known in this art. The furnaces usually comprise a well within which aluminum (or similar metals) is melted. The melting action produces a dross which is removed from the furnace, usually by a scraping action. The dross structure comprises aluminum trapped in dross material and also some free aluminum drops as well known in the melting furnace art.

The furnace will not be described in any greater detail, since only the sill height is of importance in this invention.

With reference to FIG. 5, the dross pot comprises a generally rectangular pot with sloping bottom sides 126, leading to the drainage hole 124.

In its collapsed or retracted condition a very small gap h1 preferably exists between the dross pot 12 and the inner surface of the sow mould 14.

This distance allows a certain amount of aluminum to flow out whilst the combination is being filled at the furnace sill.

The dross press may, for example, be of the type shown in U.S. Pat. Nos. 5,811,056, 5,788,918 and 5,906,790 to which reference should be made for information relating to dross presses and their operation. The operation of a dross press will be referred to herein, but reference should be made to the above U.S. Patent for any clarification of the process which is well known in the art.

The problem with having such a small gap h1 is that when the aluminum is pressed from the dross pot by the dross press, the aluminum, which will subsequently form pig 18, will rise above the level of the outlet hole 124 and as it sets the sow mould will become joined to the dross pot. This is, of course, not acceptable since the pig or ingot 18 will then not be able to be detached, therefore the combination will not perform its required function.

The combination according to the present invention overcomes this problem by enabling the sow mould 14 to move relative to the dross pot 12.

In the present invention this movement is allowed by slots and co-operating pins which allow the sow mould to drop down relative to the dross pot as the combination is lifted, for example, by the forks 30, 32 (FIG. 6) of a forklift truck (not shown) in the upward direction of arrow 34.

Other structures could be used to provide similar movement. For example, tension springs, hydraulic dampers, lazy tong arrangement or even a flexible cable of a defined length. These arrangements are such as to allow lost motion to occur between the dross pot and the sow mould, the lost motion being limited to a defined distance of travel, after which the sow mould is lifted by the upward movement of the dross pot. The invention therefore is not to be restricted by the arrangement shown in the drawings.

The structure is preferably robust to withstand mechanical damage within a foundry environment and therefore presently the slotted plate and pin arrangement is preferred and for simplification further description will be limited to this arrangement.

With reference to FIGS. 6 to 8, the sow mould 14 is shown in a position remote from the dross pot 12. As the fork lift picks up the dross pot by members 180, 182 the sow mould drops to the position shown. The level of ground 200 is indicated to show that the combination is clear of the ground and can be carried to the dross press.

In the dross press, in known manner, the dross pot is rested using the members 180, 182 on suitable rests shown diagrammatically at 40, 42 the sides of the dross press being indicated at 44, 46.

The operation of the dross press is well known. The dross in dross pot 12 is pressed by a dross press head (not shown) which comprises the dross in the pot, aluminum released by the pressing operation draining through hole 124 into the sow mould.

Because the sow mould is now separated from the dross pot a distance h2 which is far greater than h1 (see FIGS. 5 to 8) exists between the bottom of the hole of the dross pot and the sow mould.

The aluminum can flow freely into the sow mould and form a pig/ingot 18 which will normally be clear of the dross pot 12.

In the known design of dross pot/sow mould combination, the sow mould is positioned on lower bearers and is always a defined distance from the dross pot.

Once the pressing operation is completed, the known dross pot/sow mould combination is removed from the press. The sow mould being freely moveable relative to the dross pot is then separated from the dross pot and the pig/ingot is removed. The dross pot is then tipped up and the skull which remains in the dross pot is tipped out for subsequent recycling.

In the present invention, however, the sow mould is attached to the dross pot in this example by the slotted plates 162, 164, 166 and pins 168 and 1668.

Therefore, it is not possible to freely separate the sow mould from the dross pot.

In the present invention a solution is proposed to enable the pig/ingot to be tipped out of the sow mould and this is shown in FIGS. 9 to 11.

In FIG. 9 pin 1668 has been removed from plates 1660, 1662 and 1664, thereby allowing the sow mould 14 to pivot on rod 168. This can be accomplished by placing the sow mould 14 back on to the ground as shown in FIG. 3, removing pin 1668 and then lifting the combination. This will allow sow mould 14 to pivot and will deposit the pig/ingot 18 on to the ground or a suitable pile.

The sow mould 14 which is, of course, relatively heavy can be repositioned with respect to dross pot 12 by use of the forklift truck by placing the bottom edge 140 (FIG. 10) and then drawing the forklift backwards and downwards to rotate the sow mould back to its "closed" position (as in FIGS. 6 to 8). The pin 1668 can then be reinserted.

The combination can then be tipped up by the forklift to remove the skull in known manner. The combination is then ready for re-use.

The invention therefore provides a dross pot and sow mould combination, which is to all practical purposes is as low in height as possible, consistent with being able to hold a defined volume of dross. This combination can therefore be used on furnaces with low sills in contrast to previously known combinations which are either too high to be so used or have to be substantially reduced in capacity in order to fit under the sill height.

No modification is required to the furnace and only very minor adjustments will be required—if at all to the dross press. If necessary these may comprise adjusting the height of the rests 42, 44.

Since many existing furnaces have relatively low sills, the present invention includes the possible use of dross presses to such furnaces and if therefore of great commercial value.

What is claimed is:

1. A telescopic dross pot comprising a dross pot and sow mould combination, comprising mounting means connected to said dross pot and said sow mould to connect together said dross pot and said sow mould in a relationship in which said dross pot is mounted above said sow mould in which the mounting means connecting the dross pot and the sow mould comprises means enabling the sow mould to move relative to the dross pot to vary the distance between the dross pot and the sow mould.

2. A dross pot and sow mould combination as claimed in claim 1 in which the sow mould is suspended beneath the dross pot, said mounting means comprising extendable means.

3. A dross pot and sow mould combination as claimed in claim 2 in which said extendable means comprises slot means allowing said sow mould to move towards and away from said dross pot by a defined distance.

4. A dross pot and sow mould combination as claimed in claim 3 in which said slot means comprises first and second slotted members on a first side of said dross pot and at least a third slot means on an opposite side of said dross pot.

5. A dross pot and sow mould combination as claimed in claim 4 in which said third slot means includes releasable latch means and said first and second slot members comprise hinge members thereby allowing said sow mould to pivot relative to said dross pot.

\* \* \* \* \*